3,362,943
SEPARATION OF POLYMERS OF 1-OLEFINS IN MONOMER SOLUTION

Ralph W. Edwards and Alfred W. Francis, Metuchen, and William C. L. Wu, Highland Park, N.J., assignors to Mobil Oil Corporation, a corporation of New York
No Drawing. Filed June 15, 1964, Ser. No. 375,287
7 Claims. (Cl. 260—93.7)

This invention is concerned with the separation of solid, crystalline polymer of 1-olefins. It is more particularly concerned with a novel, improved process for separating the stereo-regular polymers of butene-1 and higher 1-olefins from solution in olefin monomer.

As is well known to those familiar with the art, highly tactic polymers of 1-olefins having been prepared in the presence of catalyst systems comprising (A) a compound of a transitional metal of Groups IV–A, V–A, VI–A, and VIII of the Periodic Arrangement of the Elements, wherein the metal is present in a valence state lower than its maximum, and (B) at least one organometallic compound of metals of Groups II and III of the Periodic Arrangement of the Elements.

In copending application Ser. No. 375,061, filed concurrently herewith, there has been disclosed a process for the stereospecific polymerization of butene-1 and higher 1-olefins, in which excellent yields of highly tactic polymers were obtained. That process is carried out by using sufficient excess olefin monomer and controlling the reaction conditions, so that the poly-1-olefin polymer product is maintained in solution in liquid 1-olefin monomer throughout the polymerization and the catalyst removal steps. Several methods for separating tactic polymer product from solution were disclosed. Most methods involved the handling of large amounts of liquid monomer. One method disclosed was stated to be the claimed subject matter of this application.

That method, the discovery of this invention, permits easy separation of poly-1-olefin from solution in 1-olefin monomer without handling large amounts of monomer. This is achieved by heating, in the liquid phase, the poly-1-olefin solution to a temperature above its upper cloud point, obtaining a concentrated solution (polymer-rich phase) of poly-1-olefin, from which polymer can be readily separated, and a polymer-lean phase. Because of even distribution of catalyst residues throughout both phases, this method of separation effects a reduction in catalyst residues in the finished polymer. The atactic and lower molecular weight polymers are usually removed in the polymer-lean phase, thereby providing a means for increasing the degree of tacticity of the polymer product.

Accordingly, it is an object of this invention to provide a method for separating poly-1-olefin from its solution in its liquid monomer. Another object is to provide a method for separating tactic polymers of butene-1 and higher 1-olefins from solution in liquid 1-olefin monomer without handling large amounts of monomer. A specific object is to provide a method for separating tactic poly-butene-1 and higher tactic poly-1-olefins from solution in liquid 1-olefin, in a process for stereospecific polymerization of butene-1 and higher 1-olefins in liquid monomer solution. Another specific object is to provide means for reducing the amount of catalyst residue and increasing tacticity of poly-1-olefins. Other objects and advantages of this invention will become apparent to those skilled in the art, from the following detailed description.

Throughout the specification and claims, the term "tactic" is a generic term applied to solid polymers in which there is an ordered structure with respect to the configurations around at least one main-chain site of steric isomerism per conventional base unit. Numerous types of tacticity are recognized in the art. Within the contemplation of this invention, a measure of steric order is the weight percent of the solid polymer that is insoluble in diethyl ether. A linear polymer that is insoluble in diethyl ether is considered to be tactic. Linear tactic polymers may be composed of isotactic or syndiotactic chains, blocks, or mixtures of these forms. The terms tactic, isotactic, and syndiotactic are used in accordance with the definitions tentatively approved by commission on Macromolecules of the International Union of Pure and Applied Chemistry, as outlined in the Journal of Polymer Science, volume 56, pages 153–161 (1962). Tactic polymers can contain sequences of atactic (i.e., not tactic) units in conjunction with tactic sequences and still be insoluble in diethyl ether. They are tactic polymers within the contemplation of this invention.

In general, this invention provides a method for separating poly-1-olefins from solution in liquid 1-olefin that comprises heating said solution, at a pressure to maintain liquid phase, to a temperature higher than the upper cloud point of said solution thereby obtaining a polymer-rich liquid phase and a polymer-lean liquid phase; separating the polymer-rich phase; and distilling the liquid 1-olefin from said polymer-rich phase.

This invention is particularly applicable to a method for producing a tactic polymer of butene-1 and higher 1-olefins, which comprises contacting, in the liquid phase, a 1-olefin monomer having 4 to 10 carbon atoms with a catalyst system comprising (A) a compound of a transitional metal of Groups IV–A, V–A, VI–A, and VIII of the Periodic Arrangement of the Elements wherein the metal is present in a valence state lower than its maxiumm and (B) at least one organometallic compound of metals of Groups II and III of the Periodic Arrangement of the Elements, under conditions whereby liquid monomer is a true solvent for the polymer as it forms.

The poly-1-olefins that are separated by the process of this invention are tactic polymers of a 1-olefin having between 4 and 10 carbon atoms, inclusive. It has the structure, $CH_2=CHR$, wherein R is an alkyl radical having between 2 and 8 carbon atoms. Non-limiting examples of the 1-olefin monomer include butene-1; pentene-1; 3-methylbutene-1; hexene-1; 3-methylpentene-1; 4-methylpentene-1; heptene-1; 4-methylhexene-1; octene-1; nonene-1; and decene-1.

A solution of a tactic polymer of butene-1 and higher 1-olefins in liquid 1-olefin monomer exhibits a phenomenon of having two cloud points. As the solution is cooled, a temperature will be reached at which solid polymer will come out of solution. This temperature is called the lower cloud point. On the other hand, as the solution is heated a temperature will be reached at which there will form a polymer-rich phase and a polymer-lean phase. This temperature is called the upper cloud point. At temperatures between the two cloud points there will exist a homogeneous solution of polymer in its liquid monomer.

The concentration of the tactic polymer in solution in its monomer, to which this invention is applied, can vary over a wide range. In general, the concentration of tactic polymer can be as high as 30 weight percent. Preferably it will be between about 12 weight percent and about 18 weight percent.

In the practice of this invention, a solution of tactic polymer of butene-1 or higher 1-olefin in its monomer is heated to a temperature above the upper cloud point, with a corresponding increase in pressure sufficient to maintain liquid phase. In order to obtain the benefit of increased polymer concentration, it is desirable to use as high a temperature as possible. This can be any temperature above the upper cloud point and up to the critical temperature of the 1-olefin solvent. In the case of butene-1, therefore, the solution of polybutene-1 in liquid butene-1 is heated to a temperature between about 195° F. and about 294° F. A suitable temperature is about 260° F.

As the temperature approaches the critical temperature, however, the selectivity for removing atactic and lower molecular weight polymer in the polymer-lean phase becomes poorer. This factor permits a great degree of flexibility in the tacticity of the final separated polymer. If it is desired to produce a polymer of a lower degree of tacticity, a temperature near the critical temperature is used. If, on the other hand, a product of high tacticity is desired, a lower temperature closer to the upper cloud point will be used.

When the solution of polymer in its monomer is heated above the upper cloud point, as aforedescribed, there occurs a separation into two distinct liquid phases. The lighter phase is a polymer-lean phase which comprises liquid 1-olefin containing small amounts of polymer. The amount of polymer in the polymer-lean phase usually is less than one percent. It is largely composed of atactic polymer and low molecular weight tactic polymer.

The heavier phase is a polymer-rich phase, i.e., liquid monomer containing polymer in large amounts. In the case of butene-1 the concentration of polybutene-1 in liquid butene-1 in the polymer-rich phase will be in the order of about 50 weight percent. This phase can be readily separated and treated to recover the polymer product. Feasibly, this can be done by flashing off or distilling out the 1-olefin monomer. Another modification is to heat the separated polymer-rich phase to a temperature above the critical temperature of the monomer and to flash off the monomer, thus obtaining molten polymer product. This molten product can be fed directly to a hot melt extruder.

The polymer-lean phase will contain minor amounts of decomposition products of the catalyst. If catalyst removal has been effected by water washing, this phase will also contain small amounts of water. This phase can be treated in various ways to recover pure 1-olefin monomer for recycling to the polymerization.

The catalyst system utilized in making the polymers that are separated in accordance with this invention is composed of at least two components, one being a compound of a transitional metal of Groups IV-A, V-A, VI-A, and VIII of the Periodic Arrangement of the Elements in a reduced valence state, and the other being an organometallic compound of a metal of Groups II and III of the Periodic Arrangement of the Elements. The Periodic Arrangement of the Elements, as referred to herein, is that published in the Journal of Chemical Education, volume 16, page 409 (1939).

Among the reducible transitional metal compounds are the heavy metal, inorganic compounds such as halides, oxyhalides, complex halides, hydroxides; and organic compounds such as alcoholates, acetates, benzoates, and acetyl acetonates, of the metals of Groups IV-A, V-A, VI-A, and VIII of the Periodic Arrangement of the Elements. Such metals include titanium, zirconium, hafnium, thorium, uranium, vanadium, niobium, tantalum, chromium, molybdenum, tungsten and iron. The metal titanium, zirconium and vanadium halides, particularly the chlorides, are generally preferred. The following heavy metal compounds are readily reducible: titanium tetrachloride, titanium tetrabromide, zirconium tetrachloride, vanadium tetrachloride, and zirconium acetylacetonate. These compounds can be reduced to valence states lower than maximum valence by a number of ways now well known in the art.

The other component of the catalyst system is at least one organometallic compound of a metal of Groups II and III. These compounds will have at least one hydrocarbon radical, i.e., alkyl cycloalkyl, aralkyl, alkaryl, or aryl, attached to the metal through a carbon atom. The other substituents in the organometallic compound can be hydrocarbon radicals, halogen radicals, alkoxy, amino, hydrogen, etc., or combinations thereof. Non-limiting examples of the organometallic compounds are triethylaluminum, tripropylaluminum dipropylzine, triisobutylaluminum, diethylmagnesium, diphenylaluminum chloride, cyclohexyl-ethylzinc, diethylaluminum bromide, diethylaluminum chloride, diethylaluminum iodide, ethylzinc chloride, propylmagnesium chloride, dipropylaluminum chloride, dioctylaluminum chloride, diisobutylaluminum hydride, phenylaluminum dihydride, cyclohexylbromo aluminum hydride, dipropylaluminum hydride, propyl zinc hydride, ethylmagnesium hydride, and methoxyaluminum diethyl. Mixtures of two or more organometallic compounds can be used. A preferred mixture is diethylaluminum chloride and diethylaluminum iodide, usually in a ratio of about 80 mole percent chloride and 20 mole percent iodide.

For the purpose of modifying catalyst and polymer characteristics, if desired, minor amounts of a third component can be used with the catalyst system of reduced transitional metal compound and organometallic compound. Such materials are well known to those familiar with the art and include carbides, acetylides, organophosphorus compounds, and Lewis bases.

In activating the reduced transitional metal compound (e.g. $TiCl_3$) with an organometallic compound (e.g. diethylaluminum chloride) various ratios are used. Thus, the molar ratio of these two components (e.g., Al/Ti) can range from 0.5 to 6 moles of organometallic compound per mole of reduced transitional metal compound. A ratio of between about 2:1 and about 4:1 is preferred.

It is an important feature of the process described in Ser. No. 375,061 that it is carried out using liquid 1-olefin monomer as a true solvent. Under the operating conditions of the process, the tactic poly-1-olefin product dissolves in the monomer.

As is well known in the art, the yield of tactic polymer is dependent in part upon the catalyst and varies with the catalyst system and the conditions. Such yield for a given catalyst and polymerization conditions is readily determinable by those skilled in the art. It is usually expressed as parts tactic polymer produced per part reduced transitional metal compound.

In order to maintain the solution of polymer in monomer, there must be present sufficient excess liquid monomer over that which can enter into the polymerization reaction. Generally, the concentration of tactic polymer in the liquid monomer should not exceed about 30 weight percent, because at higher concentrations efficient agitation and handling become extremely difficult. In preferred practice the concentration of tactic polymer in liquid monomer will be between about 12 weight percent and about 18 weight percent. Accordingly, there will be charged to the reaction between about 400 parts 1-olefin and about 36,000 parts or more 1-olefin per part of reduced transitional metal compound; all parts being by weight. The particular ratio of olefin to catalyst used will depend upon the desired concentration of polymer. This, in turn, is dependent primarily upon catalyst activity and residence time. Accordingly, the polymerization process must be operated at temperatures between the lower cloud point and the upper cloud point of the solution of tactic polymer in its liquid olefin monomer. The cloud points for a given poly-1-olefin in its liquid monomer can be readily determined by those skilled in the art by well-known methods. In the case of polybutene-1, the polymerization process will be operated at temperatures between about 110° F. and about 195° F. In preferred practice the process is operated at about 150° F.

As has been indicated hereinbefore, the process is carried out in the liquid phase. Accordingly, depending upon the operating temperature, there must be employed sufficient pressure to maintain the 1-olefin in the liquid phase. For each 1-olefin, the required pressure at the operating temperature can be determined by means of vapor pressure-temperature relationship curves, such as by the Cox Chart Method [cf. Ind. Eng. Chem. 15 592 (1923)].

It will be desirable in many cases to regulate the polymerization reaction, in order to control the molecular weight of the polymer product. To some extent this can be done by adjusting process variables of temperature, contact time, catalyst concentration, etc., as is well known in the art. A more feasible method is to add minor amounts of hydrogen to the reaction to reduce molecular weight. The amount of hydrogen used can range from none up to about 0.1 mole percent based upon charge.

In general, the residence time of 1-olefin reactant and catalyst system in the polymerization reactor will be between about 0.5 hour and about 10 hours. Preferably it will be about 3 hours.

Upon completion of the polymerization reaction, the catalyst can be deactivated and substantially completely removed by any method well known in the art, such as by filtration, adsorption, or alcohol extraction. A particularly feasible method is by aqueous washing of the solution of polymer in liquid monomer. The polymer is maintained in solution within the ranges of temperature and pressure used in the reactor, as set forth hereinbefore. Suitably, substantially the same temperature and pressures employed in the polymerization reaction can be used, although higher temperatures up to the upper cloud point and correspondingly higher pressures can be used. In practice, the wash water is demineralized and deoxygenated (to avoid oxidation of the transitional metal compound to oxide). If desired, basic compounds or chelating agents can be added thereto. The reduced transitional metal compound and decomposition products of the organometallic compounds will remain virtually completely with the aqueous phase. The amount of aqueous wash employed can vary between about 0.01 volume and about one volume per volume polymer solution. Usually about 0.6 volume is preferred.

After catalyst components have been removed, the tactic polymer product is separated in accordance with this invention.

EXAMPLE 1

*Polymerization*

Tactic polybutene-1 was prepared in solution in butene-1 in a continuous polymerization reactor system. Liquid butene-1 was charged to the reactor at the rate of 30 pounds per hour and hydrogen (for molecular weight control) was charged at the rate of 3.67 s.c.f. per hour. Titanium trichloride, slurried in liquid butene-1 was charged at a rate of 1.33 g. $TiCl_3$ per hour and diethylaluminum chloride at a rate of 8.8 ml. per hour. Polymerization was carried out at a temperature of 150° F. and at a pressure of 120 p.s.i.g. The average residence time in the reactor was 1.7 hours.

*Catalyst removal*

The effluent from the reactor, comprising polybutene-1 dissolved in liquid butene-1, catalyst and hydrogen, was flowed to a wash zone operated at 164° F. Deoxygenated water was introduced at a rate of 13.2 pounds per hour and intimately mixed with reactor effluent to extract the catalyst. The washed effluent was separated from the water (and catalyst) in a settling tank.

*Polymer separation*

The washed effluent comprising a solution of polybutene-1 in a liquid butene-1 was heated at 265° F. under a pressure of 490 p.s.i.g. and fed to a settling tank. In the settling tank, there formed two distinct layers. The upper layer was a butene-rich phase containing about 1 weight percent low molecular weight polybutene-1 and atactic polymer. This layer was separated and, after cleanup, was recycled.

The lower layer in the settling tank was a polymer-rich phase comprising about 50 weight percent tactic polybutene-1 dissolved in liquid butene-1. This layer was removed and butene-1 was flashed off in a flash chamber. The remaining material was polybutene-1 having an Isotactic Index of 90 and a Melt Index of between 0.25 and 0.33. Yield was 680 pounds of polymer per pound $TiCl_3$. Catalyst residues in the polymer product were 7 p.p.m. Ti, 33 p.p.m. Al, and 33 p.p.m. Cl.

The method of this invention is applicable to solutions of other poly-1-olefins in solution in 1-olefin monomer. As indicated hereinbefore, the determination of cloud point is readily determined. Such determination is illustrated in the following example.

EXAMPLE 2

Two solutions of poly-(4-methylpentene-1) in liquid 4-methylpentene-1 were prepared in sealed tubes, at polymer concentrations of 3.2 weight percent and 11.5 weight percent. Each solution was clear at 338° F. (170° C.). The more concentrated solution was quite viscous, but still stirrable. The solutions were then heated until an upper cloud point was observed. The upper cloud point of the 11.5% solution was observed at about 356° F. (180° C.). That of the more dilute solution was almost 392° F. (200° C.). The critical temperature of 4-methylpentene-1 is about 428° F.

As has been mentioned hereinbefore, the method of this invention accomplishes reduction in catalyst residue, i.e., ash, and increased tacticity. This is illustrated in the following example. This example also illustrates the use of mixed aluminum alkyl halides in the catalyst system.

EXAMPLE 3

A continuous run was made, as described in Example 1, to polymerize butene-1 to polybutene-1 in butene-1 solution, except that instead of diethylaluminum chloride in the catalyst system a mixture of 80 mole percent diethylaluminum chloride and 20 mole percent diethylaluminum iodide was used. Catalyst removal and product separation were as in Example 1.

In order to determine the efficiency of the method of separation, two samples (A and B) of product were taken at two separate times during the process. At each time, one sample (before) was taken of the water-washed product before its solution was heated and entered the settling tank and another sample (after) was taken of the product isolated from the polymer-rich phase from the settling tank. For each sample there were determined titanium (Ti) content, iodine (I) content, and isotactic index (I.I.), i.e., weight percent insoluble in diethyl ether. These data are set forth in the table.

TABLE

| Sample | P.p.m. | | I.I. |
|---|---|---|---|
| | Ti | I | |
| A (before) | 29 | 140 | 77.7 |
| A (after) | 20 | 18 | 93.2 |
| B (before) | 99 | 110 | 76.9 |
| B (after) | 55 | 23 | 92.5 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for separating tactic polymer of a 1-olefin having 4 to 10 carbon atoms from solution in its liquid 1-olefin monomer having a concentration not greater than about 30 weight percent tactic polymer, that comprises heating said solution, at a pressure sufficient to maintain liquid phase, to a temperature higher than the upper cloud point of said solution, thereby obtaining a polymer-rich liquid phase and a polymer-lean liquid phase; separating the polymer-rich phase; and distilling the 1-olefin monomer from said polymer-rich phase.

2. A method for separating tactic polybutene-1 from solution in liquid butene-1 having a concentration not greater than about 30 weight percent tactic polybutene-1, that comprises heating said solution, at a pressure sufficient to maintain liquid phase, to a temperature between about 195° F. and about 294° F. thereby obtaining a polybutene-1-rich liquid phase and a polybutene-1-lean liquid phase; separating the polybutene-1-rich phase; and distilling butene-1 from said polybutene-1-rich phase.

3. A method for separating tactic poly-(4-methylpentene-1) from solution in liquid 4-methylpentene-1 having a concentration not greater than about 30 weight percent tactic poly-(4-methylpentene-1), that comprises heating said solution, at a pressure sufficient to maintain liquid phase, to a temperature between about 356° F. and about 428° F. thereby obtaining a poly-(4-methylpentene-1)-rich liquid phase and a poly-(4-methylpentene-1)-lean liquid phase; separating the poly-(4-methylpentene-1)-rich phase; and distilling 4-methylpentene-1 from said poly-(4-methylpentene-1)-rich phase.

4. In the process for producing tactic poly-1-olefin polymer by contacting, in the liquid phase, a 1-olefin monomer having 4 to 10 carbon atoms with a catalyst system comprising component A, a compound of a transitional metal of Groups IV–A, V–A, VI–A, and VIII of the Periodic Arrangement of the Elements wherein the metal is present in a valence state lower than its maximum and component B, at least one organometallic compound of Groups II and III of the Periodic Arrangement of the Elements, using sufficient excess 1-olefin monomer whereby tactic polymer product is dissolved to form a solution of tactic polymer in its liquid 1-olefin monomer having a concentration not greater than about 30 weight percent tactic poly-1-olefin, and operating at a temperature between the lower cloud point and the upper cloud point of said solution; an improved method for separating said tactic poly-1-olefin polymer from solution in its 1-olefin monomer, that comprises heating said solution, at a pressure sufficient to maintain liquid phase, to a temperature higher than the upper cloud point of said solution, thereby obtaining a polymer-rich liquid phase and a polymer-lean liquid phase; separating the polymer-rich phase; and distilling the 1-olefin monomer from said polymer-rich phase.

5. The process defined in claim 4, wherein said component A is titanium trichloride and component B is an aluminum alkyl.

6. In the process for producing tactic polybutene-1 by contacting, in the liquid phase, butene-1 with a catalyst system comprising titanium trichloride and diethylaluminum chloride, using sufficient excess butene-1 whereby tactic polybutene-1 product is dissolved in liquid butene-1 having a concentration not greater than about 30 weight percent tactic polybutene-1, and operating at a temperature between about 110° F. and about 195° F.; an improved method for separating said tactic polybutene-1 product from solution in liquid butene-1, that comprises heating said solution, at a pressure sufficient to maintain liquid phase, to a temperature between about 195° F. and about 294° F., thereby obtaining a polybutene-1-rich liquid phase and a polybutene-1-lean liquid phase; separating the polybutene-1-rich phase; and distilling butene-1 from said polybutene-1-rich phase.

7. The process defined in claim 6, wherein the catalyst system comprises titanium trichloride and a mixture of diethylaluminum chloride and diethylaluminum iodide.

References Cited

UNITED STATES PATENTS

| | | | |
|---|---|---|---|
| 2,837,504 | 6/1958 | Hanson et al. | 260—94.9 |
| 3,125,560 | 3/1964 | Rose | 260—94.9 |
| 3,193,360 | 7/1965 | Scoggin | 260—94.9 |
| 3,197,452 | 7/1965 | Natta et al. | 260—94.9 |

JAMES A. SEIDLECK, *Primary Examiner.*

JOSEPH L. SCHOFER, *Examiner.*

L. EDELMAN, *Assistant Examiner.*